United States Patent [19]

Schetters et al.

[11] 4,150,321

[45] Apr. 17, 1979

[54] LUMINESCENT ALUMINATES AND MERCURY VAPOR DISCHARGE LAMP CONTAINING THE SAME

[75] Inventors: Cornelis W. A. Schetters; Marinus G. A. Tak; Abraham Sonneveld, all of Eindhoven, Netherlands

[73] Assignee: U.S. Philips Corporation, New York, N.Y.

[21] Appl. No.: 869,113

[22] Filed: Jan. 13, 1978

[30] Foreign Application Priority Data

Jan. 19, 1977 [NL] Netherlands ................ 7700503

[51] Int. Cl.$^2$ .................... C09K 11/46; H01J 1/63
[52] U.S. Cl. ............... 313/486; 252/301.4 R; 252/301.4 F; 252/301.4 P; 252/301.6 R; 252/301.6 F; 252/301.6 P
[58] Field of Search ............ 252/301.4 R, 301.6 R, 252/301.4 F, 301.4 P, 301.6 P, 301.6 F; 313/486

[56] References Cited

U.S. PATENT DOCUMENTS

| | | | |
|---|---|---|---|
| 3,836,477 | 9/1974 | Lagos | 252/301.4 R X |
| 4,003,845 | 1/1977 | Boom et al. | 252/301.4 R |

FOREIGN PATENT DOCUMENTS

| | | | |
|---|---|---|---|
| 2509563 | 9/1975 | Fed. Rep. of Germany. | |
| 51-1382 | 1/1976 | Japan | 252/301.4 R |
| 7214862 | 5/1974 | Netherlands | 252/301.4 R |

*Primary Examiner*—Jack Cooper
*Attorney, Agent, or Firm*—David R. Treacy; Norman N. Spain

[57] ABSTRACT

Luminescent aluminate with magnetoplumbite crystal structure, activated by cerium, by cerium and terbium or by cerium and manganese. The aluminate comprises at least one of the elements B, Si and P in a quantity of 0.001 to 0.20 mole per mole of aluminate which results in improved properties of luminescence. These aluminates are preferably used in low-pressure mercury vapor discharge lamps.

4 Claims, 1 Drawing Figure

U.S. Patent  Apr. 17, 1979  4,150,321
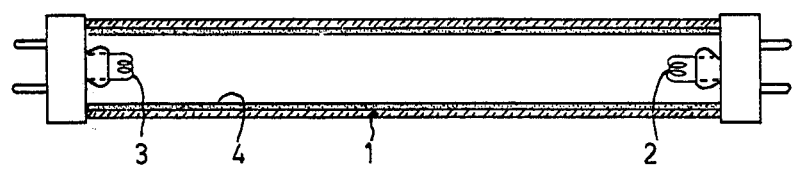

LUMINESCENT ALUMINATES AND MERCURY VAPOR DISCHARGE LAMP CONTAINING THE SAME

The invention relates to a luminescent screen provided with a luminescent aluminate with magnetoplumbite crystal structure and activated by cerium, by cerium and terbium or by cerium and manganese. In addition the invention relates to a low-pressure mercury vapour discharge lamp provided with such a luminescent screen and to the luminescent aluminate itself.

Dutch Patent Application No. 7214862 discloses a great number of luminescent aluminates which all have a hexagonal crystal structure. These aluminates which luminesce very efficiently and which have very desirable properties for practical applications can be divided as regards crystal structure into two main groups, namely the materials with $\beta$-alumina structure, (for example, the host lattices barium aluminate, barium magnesium aluminate and strontium magnesium aluminate) and the materials with magnetoplumbite structure, (for example calcium and strontium aluminate). Here said last group also includes those materials which have a distorted magnetoplumbite structure (for example lanthanum aluminate and lanthanum magnesium aluminate).

Said luminescent aluminates are obtained by means of a solid state reaction of a mixture of starting materials at a comparatively high temperature, namely at 1100-1600° C. Especially the formation of the magnetoplumbites requires a high reaction temperature (for example 1550° C.). The above-mentioned Dutch Patent Application No. 7214862 indicates the possibility to reduce the reaction temperature by the use of fluxes or melting salts. Dutch Patent Application No. 7502614 discloses the use of boric acid or a borate as melting salt for the preparation of the materials having a $\beta$-alumina structure. Therewith such a melting salt is used in such quantities in the firing mixture that the mixture comprises 1 to 3 mole B per mole of aluminate to be formed. After the reaction has finished and after cooling the product of melting salt is removed by washing with water and diluted acids. However, it was found that when boric acid is used as melting salt, which implies relatively low reaction temperatures (1100°-1200° C.), materials are obtained which have a considerably lower luminous flux than in the case these aluminates are prepared without flux.

In practice it appeared to be far from simple to prepare the aluminates with magnetoplumbite structure if one wants to obtain, on a larger scale, materials having perfectly reproducible properties. The cause of the difficulties then occurring is not so much in the high reaction temperature to be used but more in the fact that a very uniform mixture of starting materials must be available. It is tried to accomplish this, for example, by prolonged grinding of the starting materials in an aqueous suspension. However, this does not always lead to the desired result. Experiments now proved that the use of boric acid as melting salt in the preparation of the magnetoplumbite results in totally unacceptable results because the luminous flux of the materials obtained is very low and because the materials contain relatively great quantities of unwanted side phases.

It is an object of the invention to provide luminescent aluminates with magnetoplumbite structure having improved luminescent properties and which can be prepared also on a larger scale in a simpler manner than the known aluminates.

A luminescent screen according to the invention is provided with a luminescent aluminate with magnetoplumbite crystal structure activated by Ce, by Ce and Tb or by Ce and Mn, and is characterized in that the aluminate comprises at least one of the elements B, Si and P in a quantity of 0.001 to 0.20 mole per mole of aluminate.

It was surprisingly found that the use of one or more of the elements B, Si and P in very small quantities in the aluminates with magnetoplumbite structure furnishes a number of important advantages. In the first place these materials appear to have higher luminous fluxes. Therefore, when used in the luminescent screen of, for example, low-pressure mercury vapour discharge lamps they result in higher luminous fluxes. In the second place the decay of the luminous flux during the life of these lamps appears to be smaller than in the case of the known aluminates. Finally, the preparation of the aluminates according to the invention is simpler and more properly reproducible. Mixing the starting materials appears to be less critical and also dry mixtures of starting materials can be used. However, the heating temperature during the preparation must have the same or substantially the same high value as for the known aluminates. From this it appears that the addition of said additional elements does not envisage melting salt action.

The elements B, Si and P are added to the starting mixture preferably in the form of compounds which furnish these elements at an increase in the temperature, for example as boric oxide, boric acid, phosphoric acid or silicon dioxide. The added quantity of B, Si and/or P can be determined quantitatively in the final product; however, there is no certainty as regards the place where these elements have been incorporated in the luminescent material.

Already minute quantities of said elements result in a pronounced improvement in the luminous flux of the aluminates. A quantity of at least 0.001 mole per mole of aluminate is, however, chosen because otherwise too small an effect is obtained. More than 0.20 mole of the elements B, Si and/or T per mole of aluminate is not used because then no further improvement occurs anymore and a decrease in the luminous flux is even found, probably owing to the formation of disturbing side phases. An advantage of the aluminate according to the invention is, furthermore, that by a suitable choice of the content of said additional elements within the above-mentioned range the grain size of the luminescent material can be influenced.

B and/or Si are preferably used in the materials according to the invention because the best results are then obtained.

As regards the quantity of additional elements to be used preference is given to 0.005 to 0.10 mole/per mole of aluminate.

A particularly advantageous group of luminescent aluminates according to the invention has the formula $La_{1-p-q} Ce_p Tb_q Me_x Al_{2y} O_{1.5+x+3y}$; $zZ$, wherein Me represents at least one of the elements Mg, Zn and Be, and Z at least one of the elements B, Si and P, in which up to 25 mole % of the Al may have been replaced by Ga and/or Sc and wherein $$0 \leq x \leq 2$$

$5 \leq y \leq 15$ $0.001 \leq z \leq 0.20$ $0.005 \leq p \leq 0.90$ $0 \leq q \leq 0.60.$ If only Ce is used as activator in the above-mentioned materials ($q = 0$) materials are obtained which have a very efficient luminescence with an emission maximum approximately 365 nm. These materials can be used with great advantage in low-pressure and high-pressure mercury vapour discharge lamps for special applications, for example for influencing photo-chemical processes. The materials having both Ce and Tb as activator have a particularly efficient emission in the green portion of the spectrum and are of special importance for use in low-pressure mercury vapour discharge lamps for photo-copying purposes or as green component in lamps for general illumination.

Of this last-mentioned group of luminescent aluminates the composition is preferably chosen in accordance with the above-mentioned formula, wherein Me is magnesium and furthermore $p+q=1$, $1 \leq x \leq 2$, $5.5 \leq y \leq 11$ and $0.10 \leq p \leq 0.80$. The highest luminous fluxes are namely obtained with these compositions.

A second preferred group of luminescent aluminates according to the invention satisfies the formula $A_{1-p} Ce_p Me_p Al_{12-p} O_{19}$; $zZ$, wherein A represents at least one of the elements Sr and Ca, Me at least one of the elements Mg, Zn and Be, and Z at least one of the elements B, Si and P, wherein up to 25 mole % of the Al may have been replaced by Ga and/or Sc and wherein $0.005 \leq p \leq 0.25$ and $0.001 \leq z \leq 0.20$. These alkaline earth aluminates activated by Ce are very efficiently luminescing materials with emission maximum at 305–315 nm. They are mainly applied in low-pressure mercury vapour discharge lamps for medical applications, for example in erythemal lamps. Preference is given in particular to the compounds wherein strontium is chosen for A and magnesium for Me, because of their high radiation efficiency.

Embodiments of the invention will now be described in greater detail with reference to a drawing and a number of examples and measurements.

The drawing shows diagrammatically a low-pressure mercury vapour discharge lamp according to the invention.

The lamp has a glass envelope 1 and at the ends it is provided with electrodes 2 and 3. The inner surface of the envelope 1 is coated with a luminescent layer 4 which comprises a luminescent aluminate according to the invention. The aluminate can be applied to the envelope 1 by bringing a suspension of the aluminate and nitrocellulose in butylacetate into contact with the inner surface of the envelope, so that a thin layer of the suspension remains behind on the envelope. The nitrocellulose serves as a temporary binder. Thereafter the envelope is subjected to a thermal treatment whereby the temporary binder is removed and a proper adhesion of the luminescent layer is obtained.

EXAMPLES 1 TO 3 INCLUSIVE (1) A dry mixture is made of
17.30 g $CeO_2$
9.25 g $Tb_4O_7$
6.05 g MgO
92.53 g $Al_2O_3$
0.23 g $H_3BO_3$
by mixing said materials in a ball mill for approximately 15 minutes. The mixture is heated twice for 1 hour at 1550° C. in the air. Cooling after each heating operation took place in a weakly reducing atmosphere containing nitrogen with 2% by volume of hydrogen. The product obtained had the formula $Ce_{0.67} Tb_{0.33} MgAl_{12.1} O_{20.65}$; 0.025 B.

(2) The method in accordance with example 1 was repeated wherein, however, 0.46 g $H_3BO_3$ was used. The product obtained satisfied the formula $Ce_{0.67} Tb_{0.33} MgAl_{12.1} O_{20.65}$; 0.05 B.

(3) The method according to example 1 was repeated wherein, however, 0.92 g $H_3BO_3$ was used. A material was obtained which satisfied the formula $Ce_{0.67} Tb_{0.33} MgAl_{12.1} O_{20.65}$; 0.10 B.

Analyses of the aluminates according to example 1 to 3 inclusive showed that the originally added quantity of boron was found substantially quantitatively in the final product. The following table I shows measurements of these materials. The second column of the table shows the boron content B. Under the heading LO in the third column the value of the luminous flux is stated on excitation by short-wave ultraviolet radiation (mainly 254 nm) in % relative to a standard. A luminescent aluminate which contains no boron but is otherwise of the same formula as the aluminates from example 1 to 3 inclusive was used as standard. The standard was prepared by heating a mixture obtained by prolonged grinding (for example for 5 hours) in a ball mill of an aqueous suspension of the constituent oxides. Finally the table specifies under the heading $d_m$ the average grain size of the luminescent powder in μm. For comparison the table shows under the heading example $a$ the results of measurements at a luminescent aluminate which comprises no boron (not according to the invention) but which is otherwise of the same formula and prepared in the same manner as the materials of example 1 to 3 inclusive. The table shows clearly that higher luminous fluxes are obtained with the aluminates according to the invention. In addition it appears that boron furnishes higher values of the average grain size which is in general desired. Finally it appeasr possible to adjust the average grain size to a desired value by means of a proper choice of the boron content.

TABLE I.

| example | B | LO in % | $d_m$ in μm |
|---------|-------|---------|-------------|
| a | 0 | 85.1 | 1.85 |
| 1 | 0.025 | 107.8 | 4.30 |
| 2 | 0.05 | 107.3 | 5.80 |
| 3 | 0.10 | 104.9 | 7.10 |

In order to investigate the effect of larger quantities of boric acid on the formation of aluminates with magnetoplumbite structure a starting mixture of materials for obtaining the compound $Ce_{0.63} Tb_{0.37} Mg Al_{12.1} O_{20.65}$, which mixture also comprised two mole $H_3BO_3$ per mole of aluminate to be formed, was heated twice for 2 hours at 1200° C. in a weakly reducing atmosphere. The product thus obtained was washed with water and diluted acids. It was found that with such large quantities of boric acid the reaction temperature must be chosen considerably lower. The measurements of the luminous flux at this material (60%) shows that in this way materials were obtained which are not suitable for practical usage.

EXAMPLE 4

Example 2 was repeated on pilot production scale so that a greater quantity of the luminescent aluminate, which comprised 0.05 mole B, was obtained. A luminous flux of 109.7% and a $d_m$ of 4.60 µm was measured at the powder. The powder was applied to the wall of low-pressure mercury vapour discharge lamps (as shown in the drawing) of the 40 W-type. Measurements of the luminous flux, LO, in lm/W at various instants during burning of these lamps are shown in Table II. The initial luminous flux (0 h) and the luminous flux at 1000 h are also stated in % of the luminous flux at 100 h. For comparison, measurements at lamps which comprise the above-mentioned standard are shown under the heading "ref". The measurements show that with the aluminates according to the invention not only higher initial luminous fluxes but also a lower decay of the luminous flux during operation of the lamps is obtained.

TABLE II.

| | LO | | | | |
|---|---|---|---|---|---|
| | 0 h | | 100 h | 1000 h | |
| Example | lm/W | % | lm/W | lm/W | % |
| ref. | 110.1 | 103.8 | 106.2 | 96.1 | 90.5 |
| 4 | 118.3 | 100.8 | 117.4 | 115.2 | 98.1 |

EXAMPLES 5 TO 11 INCLUSIVE

In a similar manner as described in Example 1 a number of luminescent aluminates activated by Ce and Tb were prepared having compositions in accordance with the formulaes specified in the following table III. Starting point was the same raw materials as specified in example 1 in the quantities required for the desired composition. The Si-containing aluminates were obtained by adding the desired quantity of $SiO_2$. $(NH_4)_2HPO_4$ was used as raw material for the P-containing aluminates. Table III specifies the measurements of the luminous flux LO (in % relative to said standard) and of the average grain size $d_m$ (in µm).

TABLE III.

| | | LO | $d_m$ |
|---|---|---|---|
| Example | formula | % | (µm) |
| 5 | $Ce_{0.55}Tb_{0.45}MgAl_{12.1}O_{20.65};0.05B$ | 111.1 | 4.65 |
| 6 | $Ce_{0.63}Tb_{0.37}Mg_2Al_{22}O_{36.5};0.10B$ | 106.9 | 4.60 |
| 7 | $Ce_{0.67}Tb_{0.33}MgAl_{12.1}O_{20.65};0.01B$ | 109.0 | 2.57 |
| 8 | $Ce_{0.67}Tb_{0.33}MgAl_{12.1}O_{20.65};0.05Si$ | 108.6 | 3.05 |
| 9 | $Ce_{0.67}Tb_{0.33}MgAl_{12.1}O_{20.65};0.05P$ | 104.7 | 2.40 |
| 10 | $Ce_{0.67}Tb_{0.33}MgAl_{12.1}O_{20.65};0.01B;0.01Si$ | 107.3 | 2.75 |
| 11 | $Ce_{0.67}Tb_{0.33}MgAl_{12.1}O_{20.65};0.03B;0.03Si$ | 108.1 | 4.10 |

EXAMPLE 12

A mixture was made of
170.12 g $SrCO_3$
1.00 g MgO
304.61 g $Al_2O_3$
4.30 g $CeO_2$
1.55 g $H_3BO_3$ This mixture was heated for 1 hour at 1550° C. in the air. Thereafter it was cooled in a weakly reducing atmosphere (containing nitrogen with 2% by volume of hydrogen). The luminescent cerium-activated aluminate thus obtained had the formula $Sr_{0.95}Ce_{0.05}Mg_{0.05}Al_{11.95}O_{19}; 0.05 B$ and showed a very strong emission band at approximately 310 nm on excitation by shortwave ultraviolett radiation (254 nm). The peak of the emission band appeared to be 122% of the peak height of a material without boron but which was otherwise of the same composition and prepared in a similar manner. The known material appeared to have an average grain size of 1.65 µm. The material according to the invention had an average grain size of 3.55 µm.

What is claimed is:

1. A luminescent aluminate having a magnetoplumbite crystal structure and having a composition of either the formula $La_{1-p-q}Ce_pTb_qMe_xAl_{2y}O_{1.5+x+3y};zZ$ wherein Me is at least one element selected from the group consisting of Mg, Zn and Be, Z is at least one element selected from the group consisting of B, Si and P, up to 25 mol % of Al being replaceable by Ga and/or Sc and wherein $0 \leq x \leq 2$
$5 \leq y \leq 15$
$0.001 \leq Z \leq 0.20$
$0.005 \leq p \leq 0.90$
$0 \leq q \leq 0.60$ or the formula $A_{1-p}Ce_pMe_pAl_{12-p}O_{19};zZ$, wherein A is at least one element selected from the group consisting of Sr and Ca, Me is at least one element selected from the group consisting of Mg, Zn and Be, and Z is at least one element selected from the group consisting of B, Si and P, wherein up to 25 mole % of Al being replaceable by Ga and/or Sc and wherein $0.005 \leq p \leq 0.25$
$0.001 \leq z \leq 0.20$.

2. The luminescent aluminate of claim 1 wherein in the first formula Me is Mg and $p+q=1$, $1 \leq x \leq 2$, $5.5 \leq y \leq 11$ and $0.10 \leq p \leq 0.80$.

3. A luminescent aluminate of claim 1 wherein in the second formula A is Sr and Me is Mg.

4. A low pressure mercury vapor discharge lamp comprising an envelope, two electrodes at opposite ends of said envelope, and a luminescent aluminate of claim 1 disposed on the inner surface of said envelope.

* * * * *

UNITED STATES PATENT AND TRADEMARK OFFICE
CERTIFICATE OF CORRECTION

PATENT NO. : 4,150,321
DATED : April 17, 1979
INVENTOR(S) : CORNELIS W. A. SCHETTERS ET AL It is certified that error appears in the above-identified patent and that said Letters Patent are hereby corrected as shown below:

In the Claims:

Col. 6, line 37, change "Z" to --z--

Signed and Sealed this

Twentieth Day of November 1979

[SEAL]

Attest:

RUTH C. MASON
Attesting Officer

LUTRELLE F. PARKER
Acting Commissioner of Patents and Trademarks